(12) United States Patent
Gaydoul et al.

(10) Patent No.: US 9,187,642 B2
(45) Date of Patent: Nov. 17, 2015

(54) OPTICAL ELEMENTS COMPOSED OF FLAME-RESISTANT PLASTICS

(75) Inventors: Ekkehard Gaydoul, Gross-Bieberau (DE); Gerhard Zwickel, Erlangen (DE); Rupert Schnell, Worms (DE)

(73) Assignee: SCHOTT AG, Mainz (DE)

( * ) Notice: Subject to any disclaimer, the term of this patent is extended or adjusted under 35 U.S.C. 154(b) by 1425 days.

(21) Appl. No.: 12/323,791

(22) Filed: Nov. 26, 2008

(65) Prior Publication Data
US 2009/0142569 A1 Jun. 4, 2009

(30) Foreign Application Priority Data
Dec. 1, 2007 (EP) .................................. 07023322

(51) Int. Cl.
| | |
|---|---|
| B32B 27/00 | (2006.01) |
| C08L 81/06 | (2006.01) |
| C08L 71/10 | (2006.01) |
| C08L 81/02 | (2006.01) |

(52) U.S. Cl.
CPC ............... *C08L 81/06* (2013.01); *C08L 71/10* (2013.01); *C08L 81/02* (2013.01)

(58) Field of Classification Search
USPC ........................................................ 428/220
See application file for complete search history.

(56) References Cited

U.S. PATENT DOCUMENTS

| | | | |
|---|---|---|---|
| 5,916,958 A | 6/1999 | Kelly et al. | |
| 6,723,392 B1 * | 4/2004 | Jinnai et al. | 428/1.1 |
| 2002/0108708 A1 * | 8/2002 | Murano | 156/307.3 |
| 2005/0176923 A1 * | 8/2005 | El-Hibri | 528/373 |
| 2009/0043026 A1 | 2/2009 | Tanaka et al. | |

FOREIGN PATENT DOCUMENTS

| | | | |
|---|---|---|---|
| DE | 39 00 674 | | 7/1990 |
| DE | 3900674 A | * | 7/1990 |
| EP | 0 661 348 | | 7/1995 |
| EP | 1 953 194 | | 8/2008 |
| JP | 2006030405 A | * | 2/2006 |
| JP | 2006199791 A | * | 8/2006 |
| WO | 00/00537 | | 1/2000 |
| WO | 2008/059004 | | 5/2008 |

OTHER PUBLICATIONS

Machine English_Translation_JP_2006030405_A; Ishii, Kazuhiko; Light Reflection Material and Shaped Article; Feb. 2, 2006; JPO; whole document.*
Machine_English_Translation_JP_2006199791_A; Yamazaki; Polycarbonate Resin Composition for Spectacle Lens; Aug. 3, 2006; JPO; whole document.*

(Continued)

*Primary Examiner* — Tahseen N Khan
(74) *Attorney, Agent, or Firm* — Michael J. Striker

(57) ABSTRACT

The invention includes optical elements for applications in regions with stringent fire safety regulations, whose color rendering index $R_a$ is at least 97 at a thickness of 4 mm, and which are flame-retardant according to DIN 60332 and are mainly composed of a plastic having at least one structural element selected from the group consisting of sulphones, sulphides, ethers, esters, ketones and imides.

18 Claims, 4 Drawing Sheets

(56) References Cited

OTHER PUBLICATIONS

Machine_English_Translation_DE_3900674_A1; Hedtmann-Rein; High-Temperature-Resistant Polysulfone-Polyimide Block Copolycondensates, their Preparation Method and their Use; Jul. 19, 1990; EPO; whole document.*
"BASF Plastics Key to Your Success" Product Description, 2000 (With a statement of Relevancy).
DIN 6167,German Standard, Jan. 1980.
RTCA DO-160E, Dec. 9, 2004, Prepared by SC-135, RTCA, Inc. (In Eng.).
DIN 410, German Standard, Dec. 1998.
DIN EN 4102, German Standard, Jun. 2006 (With Eng. Translation).
International Standard 60332-1-2, Tests on Electric and Optical Fibre Cables Under Fire Conditions, Jul. 2004 (With Eng. Translation).
Federal Aviation Regulation, SEC. 25.869, Effective as of Apr. 15, 2004 (In Eng.).
Federal Aviation Regulation, SEC. 25.853, Effective as of Nov. 26, 2004 (In Eng.).
ABD0031 (Airbus Directive), Fireworthness Requirements Pressurized Section of Fuselage, Airbus S.AS. 2005 (Inn Eng.).

* cited by examiner

OPTICAL ELEMENTS COMPOSED OF FLAME-RESISTANT PLASTICS

BACKGROUND OF THE INVENTION

The invention relates to optical elements composed of plastics and suitable for applications in regions with stringent fire safety regulations, and to uses of the optical elements of the invention. These regions with stringent fire safety regulations are in particular aircraft interiors or else ships, where it can usually be difficult for the passengers to escape in the event of a fire. Components used in such conveyances are therefore subject to particular fire protection regulations, set out in the corresponding standards or specifications. Particularly relevant standards for aircraft are JAR/FAR 25.853a, JAR/FAR 25.869 and ABD0031.

Plastics resistant to high temperatures are known from the prior art, an example being polyphenylene sulphide, which is said to be stable in prolonged use at temperatures up to 200° C. and to withstand brief exposure to temperatures of up to 240° C. It is flame-retardant to the German DIN 4102 standard, i.e. it is self-extinguishing once the source of ignition has been removed.

DE 39 00 674 A1 likewise describes plastics resistant to high temperatures and based on copolymers of polysulphone and polyimide, these being suitable for prolonged exposure in the range from 150° C. to 180° C.

However, an intrinsic feature of all of these plastics is that although they are to some degree transparent they have a yellow colour clearly discernible by the naked eye, and cannot therefore be used as material for optical elements for passage of light in the visible region for spectrum. For this reason, by way of example, the outer panes of aircraft windows are manufactured from polymethyl methacrylate (PMMA), for which exceptional approval has been given, this material also being known by its trade name Plexiglas. This is a transparent material which is substantially colourless, but not flame-retardant. This compromise is accepted because windows with a clearly discernible colour are considered likely to be unpopular with passengers.

The mirrors in aircraft bathrooms are moreover not currently manufactured from plastics, but from polished aluminium, an attendant disadvantage of which is that the actual polishing process has high production cost. A polished aluminium surface is also susceptible to scratching, and the mirrors in aircraft bathrooms therefore require frequent replacement. This replacement is another noticeable adverse feature of airline operating costs.

Glass cannot be used as material for these applications in passenger aircraft, because laminated glass would be required in order to meet requirements for preventing injuries caused by glass splinters, and this type of glass is heavy, and reduce payload, or would undesirably increase operating costs.

SUMMARY OF THE INVENTION

Against this background, it was an object of the present invention to provide optical elements composed of plastic which are transparent and have minimum intrinsic colour, and also to provide uses of the optical elements of the invention in regions with stringent fire safety regulations. For the purposes of this application, intrinsic colour is a colour of the plastics material when it comprises none of the colorant additives which can be added with specific purpose and intention.

The object is achieved through the independent claim. Preferred embodiments are found in the subclaims.

For the purposes of the present invention, plastics are at least to some extent synthetically produced high-molecular-weight materials, also termed polymers, obtained via covalent linkage of starting materials, especially of low-molecular-weight monomers. The expression is independent of the method of production of the plastics of the invention, and therefore encompasses plastics which by way of example have been produced by chain polymerization (kinetic chain reaction or chain growth polymerization) or by way of example by step polymerization (step-growth polymerization), and in particular in this case by polycondensation or by polyaddition. The expression encompasses all of the additives which can be added. This particularly applies to plasticizers, stabilizers, fillers and/or colorants.

The optical element of the invention has a colour rendering index $R_a$ of at least 97 at a thickness of 4 mm. It is flame-retardant to DIN 60332 and is mainly composed of a plastic having structural elements selected from the group of the sulphones and/or sulphides and/or ethers and/or esters and/or ketones and/or imides.

The colour rendering index $R_a$ is a measure of colour rendering quality. The best value, with the most natural colour rendering, is 100. Optical elements through which light passes produce a colour through absorption of light at certain wavelengths. The adsorbed fractions of the spectrum are then invisible to anyone observing light passing through the optical element—it is filtered out from the initial spectrum of the light source, the resultant perception being that the optical element is coloured. In this instance the colour rendering index $R_a$ assumes values smaller than 100. Values greater than 90 are regarded as very good.

The colour rendering index $R_a$ as used in this description is determined by evaluating the colour shift of the light passing through the optical element according to the standard DIN EN 410. For this, eight different colour specimens of defined test colours are first illuminated by a light source and assessed. The optical element is then installed in front of the light source so that its light passes through the optical element, and the eight specimens of the test colours are again assessed. The value for the shift of perceived colour through introduction of the optical element for each colour specimen is weighted by the factor ⅛ and the total of these gives the colour rendering index. The light used comes from a standard illuminant $D_{65}$. The DIN standard DIN EN 410 gives a detailed description of the method for determining the colour rendering index $R_a$ and of the definition of the standard light source $D_{65}$, and that standard is incorporated by way of reference into this application. The $R_a$ value of the optical elements of the invention is determined on substantially planar panes with a thickness of 4 mm.

The optical element of the invention is moreover flame-resistant to DIN 60332. This means that it self-extinguishes within a short period after removal of the source of ignition. The flame tests make a distinction, as a function of application and installation situation, between vertical and/or horizontal tests, the flame exposure time here being 12 seconds or 60 seconds. The standard uses a burner operated with methane gas as ignition source. The dimensions of the test specimens have to be 305 mm×75 mm. The tests must be carried out at an ambient temperature of 23±2° C. and at 50% relative humidity. The observations made comprise combustion length, i.e. the permitted distance over which the material can burn within a prescribed unit of time, and also the combustion time of any drips. The abovementioned standards and their references give a detailed description of the method, and are incorporated herein by way of reference.

According to the invention, the optical element is composed of at least one plastic having structural elements selected from the group of the sulphones and/or sulphides and/or ethers and/or esters and/or ketones and/or imides.

For the purposes of the invention, structural element means that constituent of the polymer which has participated significantly or has been produced during the linkage of the monomers, thus being a suitable descriptor. According to the invention, the linkage of the structural elements preferably involves aromatic systems, and aromatic systems here are cyclic compounds having conjugated double bonds and optionally moreover containing any desired substituents. Examples of known aromatic systems are benzene and phenol. However, other systems bonding the structural elements are likewise conceivable and encompassed by the invention.

The previously known plastics resistant to high temperatures often have a yellow or brown tinge even before they are processed, i.e. they have a yellowish or brownish intrinsic colour. This means that they usually have $R_a$ values smaller than 90. The inventors have discovered that very good values for the colour rendering index $R_a$ can be achieved if high-purity starting products are used during production of the plastics. It therefore appears that the intrinsic colours are brought about by contaminants in the raw materials, or else by undesired reaction during polymerization, for example oxidation reactions or other side reactions, in which free-radical mechanisms brought about by contaminants can also be complicit.

The plastic of an optical element of the invention is preferably obtained by polycondensation and therefore preferably belong to the group of polycondensates. Polycondensation is a stepwise condensation reaction proceeding stepwise by way of intermediates which are stable but which retain reactivity, and forming macromolecules (polymers and/or copolymers) from a wide variety of low-molecular-weight substances (monomers), with elimination of simple molecules. For the purposes of this invention, a plastic obtained by polycondensation is called polycondensate or condensation polymer.

For the purposes of the invention, it is also possible that the optical element of the invention is produced mainly from a mixture of plastics which have the abovementioned structural elements. The mixing can be advantageous for appropriate adjustment of the properties of the optical element. These can in particular be mechanical properties, such as toughness and/or impact resistance, or else resistance to ultraviolet radiation, or to attack by acids and/or alkalis, and also by water.

The plastics are preferably thermoplastics, because they can use low-cost processing methods with high levels of design freedom.

It is likewise particularly preferable that the optical element of the invention is flame-resistant to the test standards ABD0031 and JAR/FAR 25.853a (App. F Part I and II) JAR/FAR 25.869.

For the purposes of the selection of the abovementioned group of plastics, the plastic of the optical element of the invention preferably comprises polysulphone. A diagram of its structural formula is

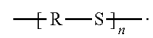

where $SO_2$ represents the structural element described above. R in the invention is any desired moiety, which can preferably comprise an aromatic system likewise described above. However, it is also possible to use non-cyclic moieties, including those having relatively few carbon atoms. The index n indicates that the sequence of the principle structural formula is repeated within the plastic. n typically assumes values of from 20 to 1000. The physical state of the plastic, when it has been processed as optical element of the invention, is preferably solid.

It is likewise preferable that the plastic of the optical element of the invention comprises polysulphide having the diagrammatic structural formula

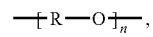

The structural element here is embodied by the element S.

It is likewise preferable that the plastic of the optical element of the invention comprises polyether having the diagrammatic structural formula

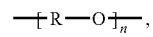

the structural element here being represented by the element O.

It is likewise preferable that the plastic of the optical element of the invention comprises polyarylate having the diagrammatic structural formula

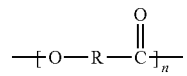

and/or having the diagrammatic structural formula

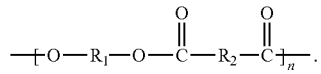

These polyarylates are members of the ester group. The structural element here can be represented by —O—R—C=O or —O—R$_1$—O—C=O. For the purposes of the invention, R$_1$ and R$_2$ represent the abovementioned moiety R, and R$_1$ and R$_2$ here can be identical or different moieties. All of the conceivable isomers thereof are also included.

It is likewise preferable that the plastic of the optical element of the invention comprises polyketone having the diagrammatic structural formula

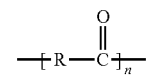

where —C=O can be the structural element.

It is likewise preferable that the plastic of the optical element of the invention comprises polyimide preferably having the diagrammatic structural formula

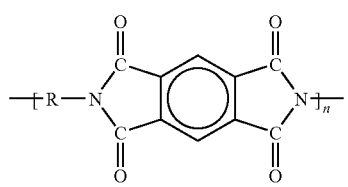

and/or having the diagrammatic structural formula

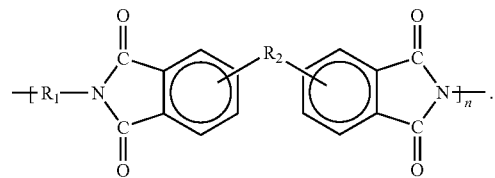

The structural element here can be represented by R—C(O)—NR—C(O)—R, where C(O) is a carbonyl function.

It is likewise preferable that the plastic of the optical element of the invention comprises polyether sulphone preferably having the diagrammatic structural formula

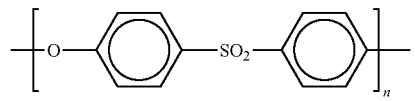

having the possible structural element O—R—SO$_2$—R and/or polysulphone preferably having the diagrammatic structural formula

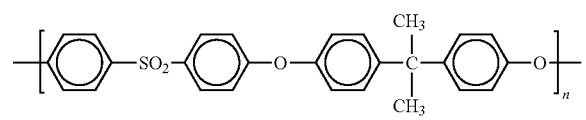

having the possible structural element SO$_2$—R—O—R—C(CH$_3$)$_2$—R—O, where C(CH$_3$)$_2$ is a dimethyl group.

It is likewise preferable that the plastic of the optical element of the invention comprises polyaryl ether sulphone preferably having the diagrammatic structural formula

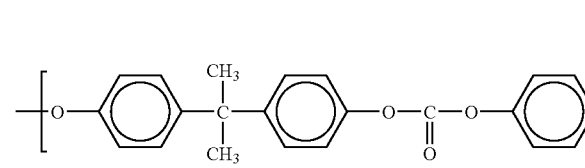

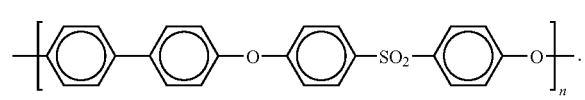

The structural element here can be represented by R—O—R—SO$_2$.

It is likewise preferable that the plastic of the optical element of the invention comprises polyetherimide preferably having the diagrammatic structural formula

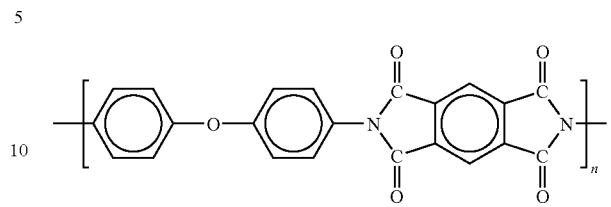

having the possible structural element O—R—C(O)—NR—C(O)—R.

It is likewise preferable that the plastic of the optical element of the invention comprises polyether ketone preferably having the diagrammatic structural formula

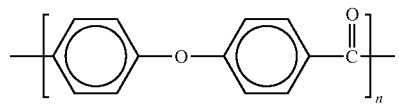

and/or having the diagrammatic structural formula

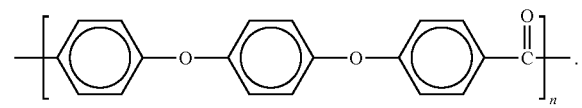

O—R—C═O and/or O—R—O—R—C═O can be the structural elements here.

It is likewise preferable that the plastic of the optical element of the invention comprises polyester carbonate, preferably from the group of the polyarylate copolymers, preferably having the diagrammatic structural formula

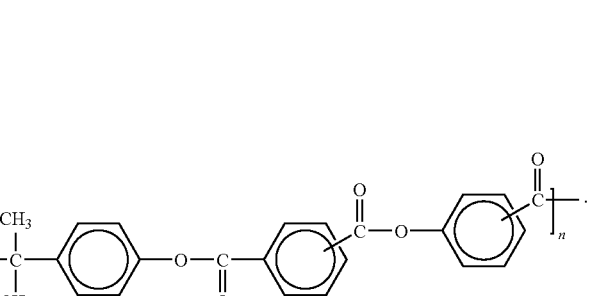

It should be emphasized that all of the derivatives and isomers of the compounds whose structural formula diagrams are given are likewise included in the invention. The inventors have also provided mixtures of the compounds mentioned within the selected group of compounds.

If polysulphide is used as constituent of the optical element of the invention, the moiety R particularly preferably includes para-phenylene, and the diagrammatic structural formula of the polysulphide can therefore be

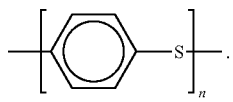

Another recognized numerical measure for evaluating the appearance of materials, alongside the colour rendering index, is the yellowness index. It is desirable to minimize the yellowing index. DIN 6167 gives a detailed description of the test method, and is incorporated herein by way of reference. Another preferred feature of the optical element of the invention is a low yellowness index, smaller than 10, preferably smaller than 5, and particularly preferably smaller than 2, in each case measured on an essentially planar pane composed of one of the plastics mentioned with a thickness of 4 mm.

The mainly yellowish or brownish intrinsic colour described for the abovementioned plastics in relation to the colour rendering index $R_a$ is also noticeable in a transmittance spectrum through reduced transmittance in the violet region of the spectrum. At a wavelength of 380 nm, the optical elements of the invention therefore have a spectral transmittance T of at least 85%, measured on an essentially planar pane with a thickness of 2 mm, produced from the selected plastics. Because no reference specimen is used during the measurement, the reflection at the boundaries of the test specimen has a transmittance-reducing effect. However, this reflection is not significant for the intrinsic colour of the optical element.

The transmittance T indicates the proportion of radiation transmitted through an object. Passage through a material always causes an attenuation, which is generally composed of absorption, scattering, diffraction and reflection, and is wavelength-dependent. Transmittance T is usually determined with the aid of a spectrophotometer. For the purposes of this invention, no reference specimen is used in the reference beam path when determining T, and transmittance is measured at the desired wavelength.

It is advantageous for an optical element of the invention to have maximum uniformity of transmittance profile in the visible region of the spectrum, the region within approximately the wavelength range from 380 nm to 750 nm. This means that at these wavelengths the value assumed by the spectral transmittance T is as far as possible of identical magnitude. However, yellowish intrinsic colours can also in particular cause reduced transmittance values in the blue region of the spectrum. It is therefore particularly preferable that in the blue region of the spectrum at a wavelength of 450 nm an optical element of the invention has transmittance T of at least 88%, again measured as described above.

The plastic present in an optical element of the invention moreover preferably has a refractive index $n_D$ which is in essence 1.65 at a wavelength of 550 nm. The definition of refractive index is known to the person skilled in the art of optical elements, and no further information on this is therefore given. The higher the refractive index, the higher the refractive power of the element. This means that an application where refraction of light is important requires less material, and the installed thickness of the optical element and/or its weight can be smaller when comparison is made with optical elements composed of materials with lower refractive indices. By way of example, Plexiglas (PMMA) has a refractive index of 1.49 and cycloolefin copolymers (COCs) have a refractive index of 1.533. If the optical element of the invention is, for example, shaped as a lens, by virtue of the higher refractive index of the element of the invention the curvature of the lens required to obtain a given focal length is less than, for example, that of a lens composed of PMMA. This makes the lens more compact and allows the structure of the final equipment comprising the lens to be compacter and therefore also less heavy. This is a considerable advantage particularly for aircraft applications.

It is also advantageous to minimize the coefficient of thermal expansion of the optical element of the invention. The coefficient of thermal expansion is a parameter which describes the percentage dimensional change, or more precisely the change in length, as a function of the change in the temperature. The larger the coefficient of thermal expansion, the greater the change in length that occurs. This is particularly problematic for components exposed to severe temperature fluctuations. Particular components of this type are aircraft windows. Every change in the length of the material has to be taken into account in the structure of the frame, so that the window has the necessary pressure resistance. An optical element of the invention therefore has a coefficient of thermal expansion which is in essence $50 \cdot 10^{-6}$ $K^{-1}$. For comparison, the coefficient of thermal expansion of Plexiglas (PMMA) is $85 \cdot 10^{-6}$ $K^{-1}$. This means that an optical element of the invention undergoes significantly less temperature-related change in length, and this makes it particularly advantageous to use the optical element of the invention as aircraft window.

Particularly in aircraft, there are special requirements in relation to vibrational safety of the components used. The requirements are also set out in the regulations for testing applied at aircraft manufacturers Boeing and Airbus, and particularly in section 8, and also sections 7.2 and 7.3, of RTCA DO-160 E, which is a standard for Operational Shock and Crash Safety, valid worldwide. The regulations for testing prescribe all of the materials and components approved for use in these manufacturers' aircraft, and are subject to monitoring by the authorities entrusted with air travel safety. A significant feature of these regulations is that the components used have to be designed in such a way that when they are exposed to the severe vibrations resulting from turbine damage, for example as a consequence of damage to turbine blades or loss of turbine blades, damage to the components is minimized, and the components do not lose their structural integrity. However, the vibrational safety demanded in aircraft can also serve as a useful property for shipbuilding, because considerable vibration can be caused, even if sometimes only for a short period, by damage to the ship's propeller or by a collision, and even in these instances the components used have to be safe. It is therefore particularly preferable that an optical element of the invention complies with the abovementioned test standards.

For the test, the appropriate applications are fixed to what are known as shakers. As a function of the installed situation, the least favourable position is selected, and the equipment is tested for stability using each of the frequency curves defined by the standards. Another particular factor checked is whether, during traversal of the frequency curves, any resonance oscillations occur which cause damage to the equipment or to its fixture.

To obtain the desired properties, it can be advantageous for fillers, reinforcing materials or substances providing special effects to be admixed to the optical elements of the invention. An amount of up to 30 percent by weight of these may be admixed with the plastic. It is preferable to use a filler and/or a filler mixture which respectively comprises $TiO_2$. Fillers and/or reinforcing materials can in particular improve the mechanical properties of the plastic. Elastomers as fillers can, for example, improve the vibrational strength of the plastic and thus of the optical element. Addition of transparent particles as substances providing special effects, preferably with a refractive index differing from that of the matrix, can by way of example have a controlled effect on the toughness of the plastic and/or on its optically conductive and light-scattering properties. Coloured substances providing special effects can be used to adjust the overall appearance of the optical element and/or its transmittance and/or backscattering behaviour, for example in order to increase perceived colour contrasts. However, the optical properties mentioned in the claims for the optical element always relate to an optical element without any fillers, reinforcing materials, and/or substances with special effect added to its plastic.

Plastics can be damaged by irradiation with light in the ultraviolet region of the spectrum (UV), approximately covering the wavelength range from 100 nm to 400 nm. The conjugated double bonds of the aromatic system often present in particular absorb UV light, and the resulting energy input can lead to fractures in the structure of the plastic. This can be discernible by way of example in cracking, or haze and discoloration of the material. In order to render the optical elements more resistant to the effects of UV light, UV-absorbent fillers can be added to the plastic. However, particular preference is given to an optical element of the invention with a UV-resistant layer. The UV-resistant layer either reflects the incident UV light or absorbs it to maximum extent within the layer, thus preventing, or minimizing the amount of, the damaging UV radiation that reaches the plastic.

The coating can have been produced by the usual processes, for example by dip-coating, spraying, lamination, electroplating, sputtering, physical vapour deposition, or any of the other processes known to the person skilled in the art. If an optical element of the invention is used as aircraft window, it is particularly preferable that the outer side of the outer window has been provided with this type of UV-resistant layer.

The particular properties of the optical elements of the invention permit their use in a variety of applications. However, they are preferably used within aircraft cabins or in the interiors of ships, for example in the lobby, in the restaurants, and in the passenger cabins and crew cabins, or else in architectural applications. In the latter, they are used in particular wherever there are stringent flame resistance requirements. Examples of these areas can be laboratories and workrooms, or else hotels, business premises and shopping centres, and also private dwellings.

One preferred use is the use as window in vehicles of any type, but in particular of aircraft or of ships. However, another advantageous use, if the weight of the vehicle can be reduced, is the use in the automobile industry as side window or as roof element and thus as sunroof. High-performance sports cars produced by many manufacturers already have side windows or roofs composed of plastics, in order to use the saving in weight to improve performance figures. However, lower vehicle weights are also advantageous for large numbers of motor vehicles, for reasons of fuel saving, which is desirable on economic grounds and also on environmental grounds. The optical elements of the invention are therefore also highly advantageous for these applications.

The optical elements of the invention can also be used as partitions. By virtue of their increased flame resistance, these partitions can preferably be used in vehicles, and in particular in aircraft interiors, in ship interiors and in trains, but can, of course, also be used in architecture, for example in interior architecture. In these application sectors it can be particularly advantageous for the optical element to have been coloured and/or to have admixed particles, which make the partition appear semi-transparent. Non-transparent partitions are, of course, also included in the inventive concept.

It is particularly preferable to use the optical element of the invention as project area. Here, moving and/or still images, or else merely light of various colours and/or non-moving or moving changes of colour, are projected onto the optical element, for example by means of a projector. Any desired illumination sources can also be used for this, examples being LEDs and/or spotlights. This type of projection surface on which various colours and/or changes of colour are projected can be used particularly advantageously to generate a variety of colour-related moods in aircraft interiors. These can be helpful in easing the transition of the passengers between various time zones and/or promoting sleep rhythms. Because the material of the optical element of the invention has high refractive index, there is not even any need to introduce light-scattering and/or reflective means into the material or to apply coatings onto the material. This means that the optical element can be transparent in the condition not irradiated with light or with images, but appears to lose its transparency when irradiated to provide the image and/or the light. This property is likewise of interest for the use as partition, since the partition can readily produce another effect. This application is particularly advantageous in aircraft interiors, where the general procedure is to provide visibility of the entire passenger compartment during take-off and landing. However, partition is desired during the flight, for example in order to separate economy class visually from business class. The use of the optical element of the invention is also relevant in this application, because, unlike in electrochromic materials, no electrical current is needed to produce transparency; the usual procedure is to switch off as much electrical equipment as possible during take-off and landing. In contrast, supply of electrical current to projectors and/or light sources during flight is not problematic. However, the invention does also include admixture of suitable substances and/or substance mixtures for this application.

Another preferred application of the optical elements of the invention is a light distributor. A light distributor is generally a means for conducting light from one site within the light distributor, in which the light beam is input, to at least one other site in the light distributor. A light distributor can by way of example be a linear optical conductor, which can be either rigid or flexible, or an optical fibre bundle and/or a light mixer.

In a linear optical conductor, the light is generally input into the light-input end and emitted from the light-output end. This method can by way of example be used to supply a plurality of components from one light source, the linear optical conductors being used to connect the components. The light is conducted by being totally reflected at the boundary between the linear optical conductor and the atmosphere. It is generally true that the only necessary condition for total reflection is known to be that the boundary of the linear optical conductor must be a boundary with a medium of lower refractive index. It is therefore also conceivable that the linear optical conductor specifically or else the light distributor generally has at least one further sheathing layer whose refractive index is preferably smaller than that of the material of the light distributor itself.

An optical fibre bundle is obtained by way of example by using the plastics mentioned to extrude fibres. It is likewise possible that preforms are produced from the plastics mentioned and are then drawn to give fibres. The thickness of these fibres is usually a few micrometers to millimeters. If a plurality of these fibres are combined, the term used is fibre bundle. It is preferable that each individual fibre of the fibre bundle has a surrounding fibre sheath whose refractive index is smaller than that of the material of the individual fibre. The result of this can be relatively little cross-over of light from one individual fibre to the adjacent individual fibre of the fibre bundle, so that attenuation of light conducted within the fibre bundle remains small and the individual fibres can conduct light independently of one another. Optical fibre bundles often have a surrounding outer plastics sheath for protection of the individual fibres.

However, another possible intention is that the light of various light sources becomes mixed in a light distributor. The light distributor is then a light mixer. A light mixer can by way of example serve to mix the light from differently coloured light sources, so that mixing of the colours produces homogeneous light of the mixed colour. The light mixer itself can in turn have connection to further light distributors, and functional light networks can therefore be realised with the aid of the optical elements of the invention.

In the case of the light mixer, it is also possible that the light distributor has at least to some extent a further surrounding layer, whose refractive index is lower than that of the material of the light distributor. However, all of the light distributors can also have at least to some extent an exterior mirror finish to make them better light conductors for certain applications.

The light distributor can generally conduct light for illumination purposes or for data transmission purposes. In the case of data transmission, light is usually conducted in the form of pulses, and the pulse sequence here represents the coded data set. However, there are also other possible coding methods, an example being amplitude modulation.

Another preferred use of the optical element of the invention is its use as light emitter. For the purposes of the invention, light from a light emitter is emitted from the optical elements of the invention into other components or else merely into the environment. In a simple case, a light emitter can be an element which concludes with attachment to an optical fibre bundle and which is used by way of example to illuminate the interior of an aircraft. The light emitter can have been shaped appropriately in order to shape the beam profile of the emitted light, for example to broaden it or to focus it.

However, another light emitter for the purposes of the invention is a linear optical conductor which in at least some regions of its outer surface has means for output of light from its interior. These means can be a roughened surface, as can be produced by sand-blasting or etching. The roughened surface comprises a large number of regions which serve as centres of scattering. To an observer, the surface of this type of linear optical conductor appears to shine. This method can be used to achieve decorative lighting effects which can be advantageous for the design of aircraft interiors, or presentation of safety information, an example being the marking of escape routes, or else for general design purposes.

One particularly preferred use of the optical element of the invention as light emitter is an illuminated panel. In an illuminated panel, the optical element of the invention in essence takes the form of a panel, which, however, can have been deformed in all planes, where light can be input into the edge areas of the panel. The panel here acts not only as an optical conductor but also as a light mixer. The light can be input by means of one, or a plurality of, fibre bundle(s), or else via LEDs attached at least in the immediate vicinity of the edge areas. The input light can be output at any desired site on the surface of the panel by applying centres of scattering. The centres of scattering are preferably produced by the roughening methods described above. A structured application of the centres of scattering is also possible here, for example via masking techniques, and it is thus possible to apply static image information on the illuminated panel, examples being logos and/or alphanumeric symbols, e.g. information and/or descriptions.

For the purposes of the invention it is possible to use not only the roughening process but also any of the other methods for achieving light output from the optical element. By way of example, structures can have been introduced into the surface of the optical element which can protrude into the surface and/or can protrude out from the surface. These structures are preferably prism-shaped. These structures can be produced easily by embossing techniques, or by other production methods, such as etching or any of the other methods.

An advantage of illuminated panels is that by virtue of input at the edge they can have very low installed thickness and they can have any desired curved surfaces. It is therefore very particularly preferable to use illuminated panels as elements of interior cladding of aircraft cabins. These can easily be used with input from multicoloured light sources to obtain ambience lighting in which colour effects do not merely have aesthetic functions but also increase the feeling of wellbeing of the passengers by promoting their sleeping-and-waking rhythm, by means of appropriately adjusted colour changes.

Light guide plates are one particular usage type of illuminated panels, and are installed in flat display screens. These are an important component of these display screen systems where these require background illumination. LCD display screens and TFT display screens are examples here. Light from at least one light source is input into the light guide plates, and is distributed over a large area. The surface of the light guide plate usually has means of light output, examples being centres of scattering, or structures in the form of microprisms. The light guide plates of flat display screens installed in aircraft, for example in the backrests of passenger seats, have hitherto been composed of PMMA, which is relatively combustible. This has hitherto been accepted by aircraft manufacturers and airlines, in order to offer passengers an ever-broader range of entertainment. However, use according to the invention of the optical elements as light guide plate for flat display screens means that even these components can be designed to meet more stringent fire safety regulations. The invention can make a substantial contribution to passenger safety specifically with regard to display screens, which are becoming ever larger, and to passenger aircraft in which a considerable amount of PMMA has hitherto been installed.

Similar considerations apply when the optical element of the invention is used as protective covering for display screens, where it acts as light emitter.

Another preferred use of the optical element is the protective covering of light sources, for example lamps, but in particular LEDs. Here too, the optical element is in principle a light emitter. The optical element here can have been shaped as desired for beam-shaping purposes, for example in the shape of a lens. Because it is composed of plastic, the production of such shapes can be achieved particularly simply and at particularly low cost. It is also possible to control the emitted light spectrum as desired via selection of appropriate substances providing special effects. By way of example, fluorescent and/or phosphorescent substances providing special effects can be utilised to make the optical element act as a convertor for white light LEDs.

Another preferred use of the optical element of the invention is as illuminable woven fabric. For this, fibres composed of the plastics mentioned are woven together, and specific weaving methods can be used here. If light is input into the fibres of the woven material, the fibres serve as optical conductors. The light can be output at the fibre ends. If fibre ends are present on the surface of the woven material, individual points of light are discernible on and/or in the woven material. However, it is also possible to create light output sites as desired in and/or on the surface of the woven material, for example by roughening and/or abrasion of the fibres. This method can be used to make the entire surface appear luminous. These woven materials can by way of example serve as seat coverings or else intrinsically luminous curtains and/or wallcoverings.

Given a suitable choice from the possible uses described, another advantageous possibility can use the optical elements of the invention to set up functional light networks in particular for illumination purposes, and these can fulfil aesthetic, psychological and physiological functions.

If the optical elements of the invention are used as mirror carriers, they can replace the polished aluminium sheets used in aircraft. For this, a reflective surface is applied on that side of the optical element facing away from the user, so that the light reflected from the user by the reflective surface passes through the optical element. The reflective surface can be applied by any suitable process. The most familiar processes are vapour deposition, liquid coating or adhesive bonding using a reflective foil.

BRIEF DESCRIPTION OF THE DRAWING

The objects, features and advantages of the invention will now be illustrated in more detail with the aid of the following description of the preferred embodiments, with reference to the accompanying figures in which.

DETAILED DESCRIPTION OF THE INVENTION

Figure 1:
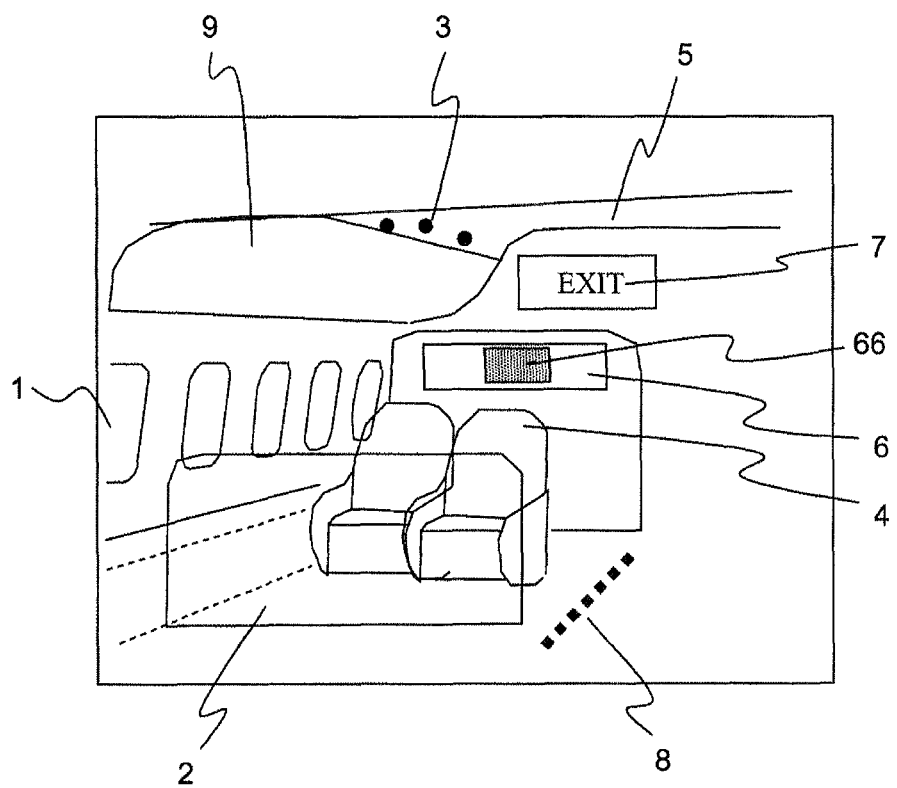
FIG. 1 is a perspective view of the interior of an aircraft showing an example of a window according to the invention.

FIG. 1 shows the interior of an aircraft. The window (1) represents one preferred use of the optical element of the invention. It can include an inner and an outer transparent pane, held together by a suitable frame. The partition (2) can be used for design purposes to divide the interior space. However, it can in particular serve to separate the different air travel classes from one another. The partition (2) is preferably transparent. On the ceiling of the aircraft interior, there are light emitters (3) provided, which illuminate the gangway. These can have been designed in the form of lenses, in order to provide controlled illumination of the floor of the gangway without dazzling the passengers. The design of the optical-effect seat covering (4) can be such as to illuminate either the contours of the seat or the sitting area, armrest area and/or backrest area of the seat. For this, it is preferable to use a woven fabric which is composed of individual optically conductive fibres and which can have been provided with a protective foil or else can have other substances included in the weave. Within the ceiling element (5), there can be a large number of light emitters attached, taking the form of end sections for output of the light from optical fibres. This type of illumination is also known in the form of a star-studded-sky effect in architectural applications. The diameter of the light emitters is generally about 1 mm, and about 100 light emitters are attached per square meter of surface, in order to achieve an aesthetically attractive star-studded sky effect. The luminous panel (6) has been attached in the wall. If the light input power rating is sufficient, this luminous panel (6) can serve for illumination of the cabin, but if the power rating of the light sources is reduced it can also have decorative functions. Integrated into the luminous panel (6) there can also be a display screen (66), in which the optical element serves as protective covering and/or as light guide plate. The display screen (66) can also have been attached at any desired suitable site in the aircraft interior. In this example, the information panel (7) indicates an emergency exit, and it too, is formed by a luminous panel. The design can have luminous characters, where the surface of the luminous panel has been structured in the shape of the characters, or else it can have non-luminous characters, where the entire surface of the luminous panel is luminous and the characters have been applied by printing or by using a foil. Luminous strips (8) have been installed in the floor, and indicate the route to the emergency exit. These escape route markings are compulsory in aircraft interiors, and have to retain their visibility even in dense smoke. The ceiling element (9) has been designed as a curved luminous panel. It can preferably be used to provide ambience lighting and to produce changes of colour in the aircraft interior.

Figure 2:
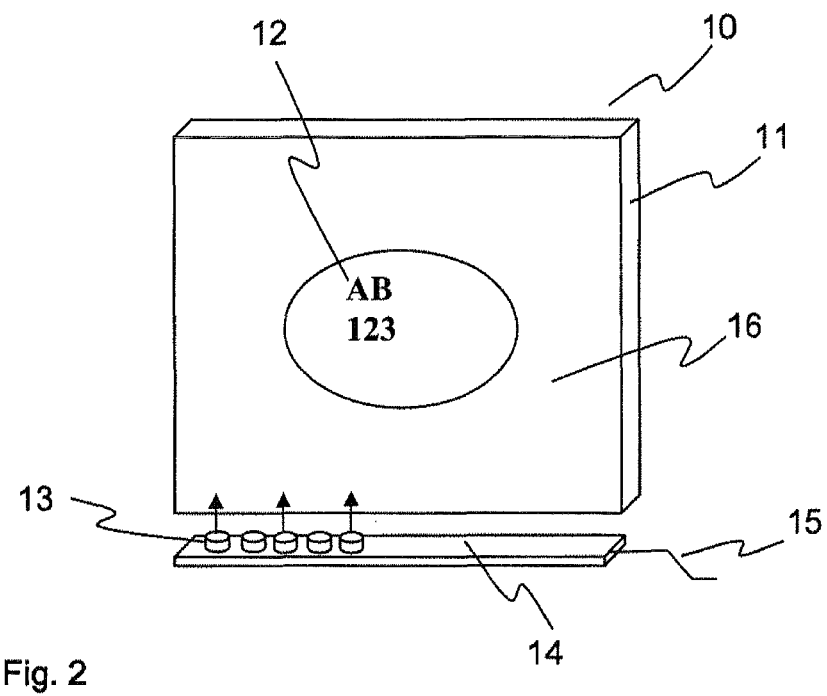
FIG. 2 is a perspective view of a luminous panel according to the invention showing its structure.

FIG. 2 is a diagram of the structure of a luminous panel (10). Light from LEDs (12) is input into the edges (11), and the LEDs (13) have preferably been fixed on a printed circuit board (14). The printed circuit board (14) provides a simple method of supplying current to the LEDs.

This in particular permits cost-effective realization of the complicated circuits required for control of coloured LEDs to produce the mixed colours desired. The printed circuit board (14) can have connection to a source of electrical current by means of normal cable connections or wire connections (15). The luminous panel (10) can have a region (12) on which static image information is visible, examples being logos and/or alphanumeric symbols. These effects are produced via structuring of the region (12) and are then luminous effects, or, for a uniformly luminous surface (16), they are produced via at least one layer of a material which is non-translucent or at least less translucent, the information provided in this instance being itself non-luminous.

Figure 3:
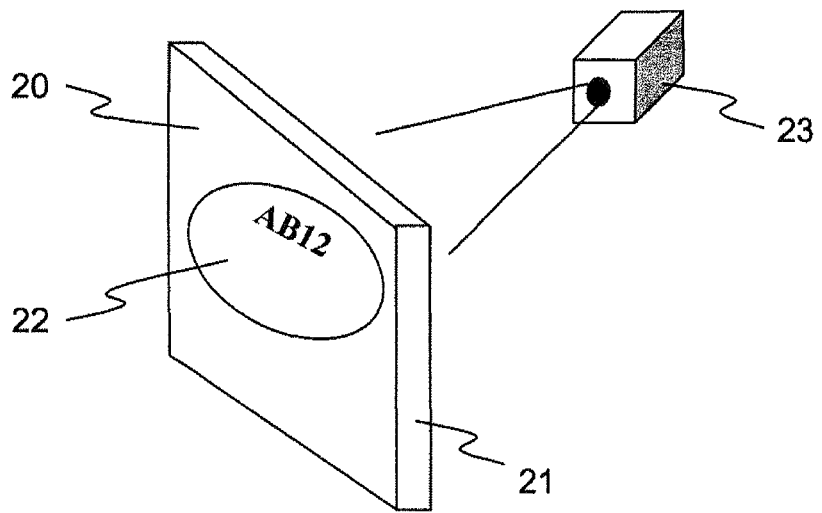
FIG. 3 is a perspective view of an optical element according to the invention acting as a projection surface.

FIG. 3 shows the use of the optical element as projection surface (20). A projector (23) irradiates at least one region (22) of the projection surface (20). The region (22) can also have light-scattering particles or can have been roughened, in order to improve reflection or scattering of the projected light and thus improve its visibility. There can also be structures introduced into the projection surface (20), and these can by way of example take the form of microprisms. Static or moving images and/or alphanumeric symbols can be presented. Since the available prior art can provide projectors (23) controlled by means of computers, the information presented can be of almost unlimited variability and scope. However, it is also possible simply to project light and/or changes of colour, and the projection surface (20) can thus also serve for ambience lighting applications. It is also possible to combine the projection surface (20) with the illuminated panel (10) from FIG. 2, by also inputting light from LEDs into at least one edge (21) of the projection surface (20).

Figure 4:
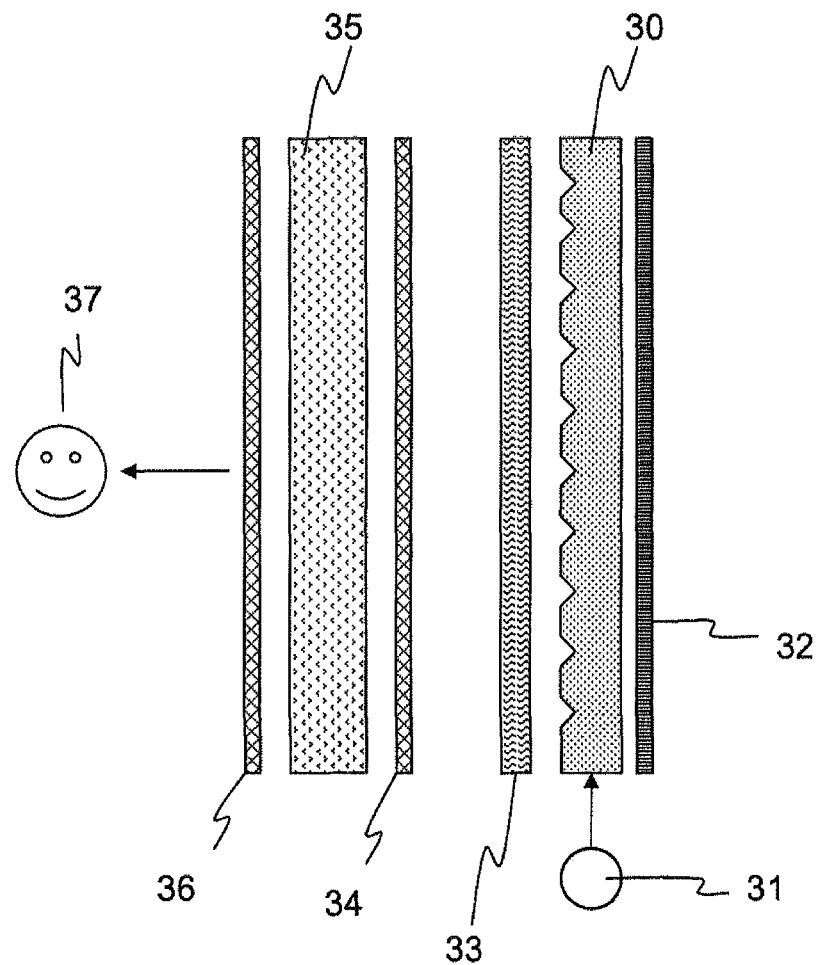
FIG. 4 is a cross-sectional view of a flat LCD display screen according to the invention showing its structure.

FIG. 4 is a diagram of the structure of a flat LCD display screen. Light from the light source (31) is input into at least one lateral edge of the light guide plate (30). The light source (31) can by way of example be realised via a gas discharge lamp and/or one or more LEDs, or else via any other suitable light source. The light guide plate (30) has a reflective element (32) on its reverse side. This can be a separate mirror, or else a coating and/or foil. The input light is output on the frontal side, i.e. on that side of the light guide plate (30) facing towards the user (37) of the flat display screen. To this end, the light guide plate (30) can have a structure as shown in the drawing, for example in the form of microprisms. The possible methods of producing the structures have been described above. It is also possible to use any of the other measures for achieving light output from the surface. To give the impression of a surface of uniform brightness, there can be a diffuser plate (33) in front of the light guide plate (30). However, it is also possible that the design of the luminous plate (30) and/or the manner of light input is/are such as to ensure that the luminous surface is uniform, in which case the diffuser plate (33) can be omitted. The elements (34) to (36) are the LCD unit of a flat display screen. LCD is known to stand for liquid crystal display. The elements (34) and (36) are the polarization filters, here taking the form of plates, with the liquid crystal display element (35) between these. The structure of flat display screens is known per se from the prior art and is not provided by the invention. The invention provides an optical element which can be used as light guide plate (30) and/or as protective covering in flat display screens. The use of the optical element of the invention for flat display screens has the advantage that they can be substantially more fire-resistant than hitherto, and they can therefore contribute to user safety in conveyances, or else in offices, factories, laboratories or in households.

Figure 5:
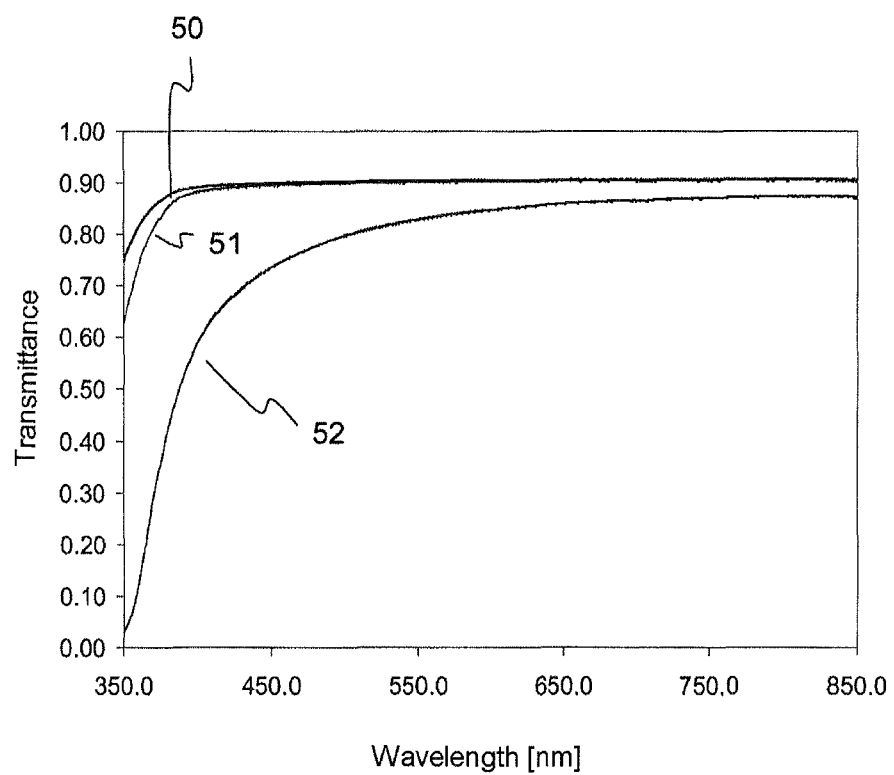
FIG. 5 is a graphical illustration of the dependence of the transmittance of plastic planar sheets on wavelength.

FIG. 5 shows the transmittance of substantially planar sheets composed of a plastic mainly composed of polyether sulphone, as a function of wavelength. A spectrophotometer was used to make the measurement, using air as reference. The curve (50) shows the transmittance of a sheet with thickness 2 mm, and curve (51) shows the transmittance of a sheet with thickness 4 mm, both composed of high-purity polyether sulphone. Both sheets can be used to produce the optical elements of the invention. Curve (52) represents the prior art, namely being the transmittance curve for a plastics sheet of thickness 4 mm composed of commercially available polyether sulphone. It should be noted that the transmittance of the sheet of the prior art is markedly below that of the sheets from which the optical elements of the invention can be produced. The fact that the maximum transmittance reached by curves (50) and (51) is only about 0.90 derives from the reflection losses of the analytical light within the plastics sheets, and also from intrinsic absorption within the plastic. However, the intrinsic absorption of pure plastics appears to be small, as can be seen from the small difference between the transmittances of the specimens of thickness of 2 mm and 4 mm. If intrinsic absorption were high, the difference between the maximum transmittances in curves (50) and (51) would be greater.

However, the specimen from the prior art, depicted as curve (52), exhibits much greater intrinsic absorption. The poorer transmittance is very probably attributable to impurities in the plastic. The transmittance curves for all of the specimens rise from the initial value shown at a wavelength of 350 nm to maximum transmittance values at a relatively distant point in the red region of the spectrum. In the case of the specimens from which curves (50) and (51) are derived, a plateau is reached with almost constant transmittance, beginning at a wavelength of about 450 nm. The initial value for curve (52) is significantly below that of the other curves, and it is not possible to identify a plateau with constant transmittance. This characteristic of the comparative specimen from the prior art (curve (52)) is also discernible from the yellowish-brown colour of this specimen, clearly caused by the poorer transmittance specifically in the blue region of the spectrum. Its $R_a$ value is 96.2, whereas the $R_a$ values of both of the specimens composed of the purer plastic of thickness 2 mm and 4 mm (curves (50) and (51)) are 99.6. Good $R_a$ values begin from 97, particularly preferably from 98 and very particularly preferably from 99, irrespective of the plastics present. The yellowness index of the comparative specimen (curve (52)) is 13.0, indicating marked yellowing, and that of the specimens composed of the pure plastic of thickness 2 mm (curve (50)) is only 0.8 mm, and at thickness of 4 mm (curve (51)) still only 1.1. These low yellowness indexes for the specimens composed of the pure plastic are surprising and serve to emphasize that these materials have good suitability for the production of the optical elements of the invention.

Table 1 lists the transmittance values measured for the abovementioned specimens at a wavelength interval of 10 nm. Specimen 1 indicates the specimen of thickness 2 mm mainly composed of polyether sulphone and shown as curve (50) in FIG. 5, specimen 2 indicates the specimen of thickness 4 mm composed of the same material and shown as curve (51) in FIG. 5, and the comparative specimen indicates the specimen of thickness 4 mm shown as curve (52) in FIG. 5. It is composed, as has been described, of the distinctly coloured plastic of the prior art.

TABLE 1

| Wavelength in nm | Transmittance | | |
|---|---|---|---|
| | Specimen 1 | Specimen 2 | Comparative Specimen |
| 350.0 | 0.75 | 0.63 | 0.03 |
| 360.0 | 0.81 | 0.74 | 0.12 |
| 370.0 | 0.85 | 0.81 | 0.28 |
| 380.0 | 0.87 | 0.85 | 0.41 |
| 390.0 | 0.89 | 0.87 | 0.51 |
| 400.0 | 0.89 | 0.88 | 0.58 |
| 410.0 | 0.89 | 0.89 | 0.63 |
| 420.0 | 0.90 | 0.89 | 0.67 |
| 430.0 | 0.90 | 0.89 | 0.70 |
| 440.0 | 0.90 | 0.89 | 0.72 |
| 450.0 | 0.90 | 0.90 | 0.74 |
| 460.0 | 0.90 | 0.90 | 0.75 |
| 470.0 | 0.90 | 0.90 | 0.76 |
| 480.0 | 0.90 | 0.90 | 0.78 |
| 490.0 | 0.90 | 0.90 | 0.79 |
| 500.0 | 0.90 | 0.90 | 0.80 |
| 510.0 | 0.90 | 0.90 | 0.81 |
| 520.0 | 0.90 | 0.90 | 0.81 |
| 530.0 | 0.90 | 0.90 | 0.82 |
| 540.0 | 0.90 | 0.90 | 0.82 |
| 550.0 | 0.90 | 0.90 | 0.83 |
| 560.0 | 0.90 | 0.90 | 0.83 |
| 570.0 | 0.90 | 0.90 | 0.84 |
| 580.0 | 0.91 | 0.90 | 0.84 |
| 590.0 | 0.91 | 0.90 | 0.84 |
| 600.0 | 0.91 | 0.90 | 0.85 |
| 610.0 | 0.91 | 0.90 | 0.85 |
| 620.0 | 0.91 | 0.90 | 0.85 |
| 630.0 | 0.91 | 0.90 | 0.86 |
| 640.0 | 0.91 | 0.90 | 0.86 |
| 650.0 | 0.91 | 0.90 | 0.86 |
| 660.0 | 0.91 | 0.90 | 0.86 |

An advantage of the optical elements of the invention over optical elements available hitherto with good transmittance properties and good colour rendering properties, for example those composed of glass, is that they are composed of plastic and thus have low intrinsic weight, and that they are easily moulded, and can therefore be produced at low cost. In contrast to optical components composed of glass, they are intrinsically safe in preventing injuries caused by glass splinters, and are vibration-resistant to the specifications of the leading manufacturers of passenger aircraft. Unlike known optical elements composed of plastic, they can comply with fire-resistance approval regulations applicable to air travel, and have very good values for colour rendering index and yellowness index, these being essential features for their suitability as optical elements. They thus combine the advantages of glass and of traditional plastics. This provides access to a wide variety of application sectors where the optical elements of the invention contribute to the safety of their users.

We claim:

1. A fire-resistant optical element for a vehicle or a building, said optical element consisting of a polymer compound and up to 30 wt. % of at least one additive ingredient, wherein said at least one additive ingredient is selected from the group consisting of fillers, reinforcing materials and materials that provide a special effect;

wherein said polymer compound has a spectral transmittance T of at least 85% at a wavelength of 380 nm and at a thickness of 2 mm, said polymer compound transmits light with wavelengths in a range of 380 nm to 750 nm, said polymer compound has a colour rendering index $R_a$ of at least 97 at a thickness of 4 mm as measured with a standard light source $D_{65}$, said polymer compound is flame-retardant according to DIN 60332; and wherein said polymer compound consists of:

a polysulphide with a structural formula (II):

(II)

or a polyether sulphone with a structural formula (IX):

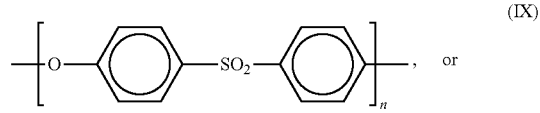
(IX)

or a polyaryl ether sulphone with a structural formula (XI):

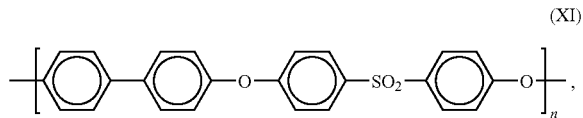
(XI)

wherein R is a para-phenylene group and n is from 20 to 1000.

2. The optical element according to claim 1, wherein said spectral transmittance T is at least 88% at said wavelength of 380 nm and at said thickness of 2 mm.

3. The optical element according to claim 1, wherein the plastic has a refractive index $n_D$ of 1.65 at a wavelength of 550 nm.

4. The optical element according to claim 1, having a coefficient of thermal expansion of $50 \cdot 10^{-6}$ $K^{-1}$.

5. The optical element according to claim 1, which is vibration-resistant according to test standard RTCA DO-160 E.

6. The optical element according to claim 1, wherein the at least one additive ingredient is one of said material fillers and said one of said material fillers is $TiO_2$.

7. The optical element according to claim 1, further comprising a UV-resistant coating.

8. The optical element according to claim 1, which consists of a light distributor, a light emitter, a luminous panel, a light guide plate of a flat display screen, a protective covering for a light source or display screen, or an illuminable woven fabric.

9. The optical element as defined in claim 1, which consists of said polysulphide of formula (II).

10. The optical element as defined in claim 1, which consists of said polyether sulphone of formula (IX).

11. The optical element as defined in claim 1, which consists of said polyaryl ether sulphone of formula (XI).

12. The optical element as defined in claim 1, which consists of a window of an aircraft or a boat, a mirror carrier for a reflective surface in an aircraft or a boat, a light guide plate of a flat screen display in an aircraft or a boat, or a cover of a light source in an aircraft or a boat.

13. The optical element as defined in claim 1, which includes said at least one additional ingredient in an amount up to 30 wt. %.

14. A vehicle containing the fire-resistant optical element of claim 1.

15. An aircraft containing the fire-resistant optical element of claim 1.

16. A building containing the fire-resistant optical element of claim 1.

17. The optical element according to claim 1, having a yellowness index that is less than 10 at a thickness of 4 mm as determined according to DIN 6167.

18. The optical element according to claim 17, wherein said yellowness index is less than 5 or less than 2.

* * * * *